(12) United States Patent
Will

(10) Patent No.: US 6,657,851 B2
(45) Date of Patent: Dec. 2, 2003

(54) LAYER STACK

(75) Inventor: Norbert Will, Heidenheim (DE)

(73) Assignee: EPCOS Aktiengesellschaft, München (DE)

( * ) Notice: Subject to any disclaimer, the term of this patent is extended or adjusted under 35 U.S.C. 154(b) by 0 days.

(21) Appl. No.: 10/182,451

(22) PCT Filed: Jan. 5, 2001

(86) PCT No.: PCT/DE01/00013

§ 371 (c)(1),
(2), (4) Date: Jul. 26, 2002

(87) PCT Pub. No.: WO01/57894

PCT Pub. Date: Aug. 9, 2001

(65) Prior Publication Data

US 2003/0011966 A1 Jan. 16, 2003

(30) Foreign Application Priority Data

Feb. 3, 2000 (DE) .......................................... 100 04 706

(51) Int. Cl.⁷ ................................................. H01G 4/32
(52) U.S. Cl. ........................ 361/511; 361/521; 361/530
(58) Field of Search ................................ 361/511, 516, 361/508, 509, 528, 529, 530, 302

(56) References Cited

U.S. PATENT DOCUMENTS

| | | | |
|---|---|---|---|
| 3,868,589 A | * | 2/1975 | Wang .......................... 372/96 |
| 5,584,890 A | | 12/1996 | MacFarlane et al. |
| 5,643,484 A | * | 7/1997 | Swars et al. ................. 219/552 |
| 5,661,629 A | | 8/1997 | MacFarlane et al. |
| 6,111,534 A | * | 8/2000 | Escarmant ..................... 342/1 |

* cited by examiner

Primary Examiner—Anthony Dinkins
(74) Attorney, Agent, or Firm—Schiff Hardin & Waite

(57) ABSTRACT

The invention is directed to a layer stack for the acceptance of a liquid having a suction layer (1) with high absorbency sufficing for sucking up the liquid from the edge of the layer stack into its middle and having a first storage layer (2) with low absorbency that is not sufficient for sucking up the liquid from the edge of the layer stack up to its middle between which an intermediate layer (3) composed of non-absorbent material and adjoining the first storage layer (3) is arranged, whereby a non-absorbent edge layer (7) is arranged at that side of the first storage layer (2) facing away from the intermediate layer (3), and whereby the intermediate layer (3) comprises through holes (4) whose plurality, size and distribution is selected such that some of the liquid suctioned up by the suction layer (1) can proceed via the holes (4) to the first storage layer and thoroughly saturate this. By foregoing a second suction layer, electrolytic capacitors with a significantly lower space requirement can be manufactured.

19 Claims, 1 Drawing Sheet

LAYER STACK

BACKGROUND OF THE INVENTION

The invention is directed to a layer stack for the acceptance of a liquid, which stack has a suction layer, a storage layer and an intermediate layer.

Layer stacks of the species initially cited are known from electrolytic capacitors whereby the intermediate layer is fashioned as an anode layer, and whereby a respective suction and a storage layer are arranged at both sides of the intermediate layer. The two outermost layers of the layer stack defined in this way are respectively covered by a cathode foil. The suction or, respectively, storage layers are typically implemented as paper layers, whereby the suction layer is a paper with low density (<0.6 g per cm$^3$) and the storage layer is a paper having high density (>0.6 g per cm$^3$). The paper layers are saturated with an electrolyte. They therefore serve, first, as storage medium for the electrolyte. Second, the paper layers also have the job of limiting the current of the mobile ions present in the electrolyte and thus achieving a high dielectric strength of the electrolytic capacitor. The electrolytic capacitors are typically manufactured by winding the above-described layer stack onto a winding mandrel, as a result whereof a cylindrical body arises. Particularly given electrolytic capacitors with high capacitance (>1 mF), cylinders having a length of a few centimeters are formed. The electrolyte is introduced into the capacitor after the winding of the capacitor. Due to the wound structure, the electrolyte can only be supplied from the end faces of the wound capacitor. Given electrolytic capacitors that exceed a specific length, the suction layer is required in order to transport the electrolyte from the end faces into the inside. Since the suction layer is a low-density paper and has great channels, it is not suitable for achieving a high dielectric strength. The storage layer implemented as high-density paper is therefore additionally inserted between anode foil and cathode foil. The dense paper comprises channels with a small cross-section and is thus extremely well suited for achieving a high dielectric strength. Due to its low absorbency, however, the dense paper does not suffice as a sole intermediate layer between cathode foil and anode foil. The various layers described given the known structure lead to a high volume requirement of the electrolytic capacitor relative to its capacitance. Particularly where electrolytic capacitors are to be built into miniaturized circuits, this is a considerable disadvantage.

SUMMARY OF THE INVENTION

An object of the present invention is therefore to offer a layer stack that, by foregoing one of the two suction layers, comprises a lower volume requirement.

This goal or object is inventively achieved by a layer stack for the acceptance of a liquid that comprises a suction layer, a storage layer, an intermediate layer and an edge or boundary layer. The suction layer has a high absorbency sufficing for sucking up the liquid from the edge of the layer stack into a middle of the stack. The first storage layer has a low absorbency that is not sufficient for sucking up the liquid from the edge of the layer stack up to the middle. An intermediate layer adjoining the storage layer is arranged between the storage layer and the suction layer. The intermediate layer is composed of a non-absorbent material and comprises through holes. These holes connect the upper or one side of the intermediate layer to the other side or underside and are selected such in terms of plurality, size and distribution that some of the liquid suctioned up by the suction layer that is applied at the edge of the layer stack can proceed via the holes of the intermediate layers to the first storage layer and thoroughly saturate this first storage layer. A non-absorbent edge or boundary layer is arranged at that side of the first storage layer facing away from the intermediate layer. The storage layer is thus saturated with liquid exclusively via the holes in the intermediate layer.

The inventive layer stack has the advantage that a second suction layer arranged at the side of the storage layer can be eliminated by utilizing the holes found in the immediate layer for saturating the storage layer arranged at that side of the intermediate layer facing away from the suction layer. As a result thereof, the volume requirement of the layer stack is reduced.

The inventive layer stack can be especially advantageously fashioned as an electrolytic capacitor. To that end, a second storage layer is arranged at the side of the suction layer. Either the second storage layer or the suction layer can be adjacent the intermediate layer, since a good soaking of the first storage layer is achieved in both instances. The boundary or outer layer is fashioned as a first cathode layer. A second cathode layer is arranged at that side of the layer stack lying opposite the first outer layer or cathode layer. When an electrolyte, i.e., for example, an organic liquid, which has ions that conduct the electrical current is also employed, then the inventive layer stack can be employed as an electrolytic capacitor. An electrolytic capacitor designed in this way is especially space-saving due to the elimination of a second suction layer.

Paper layers are especially advantageously utilized as the suction or, respectively, storage layer. These paper layers are simultaneously suitable for the electrical insulation between the anode layer and the cathode layer and for the limitation of the ion current. The ion current is inhibited all the more greatly the thicker the paper layer between the cathode layer and the anode layer is. A paper having a density $\rho_1$<0.6 g per cm$^3$ is employed as the suction layer. A paper having such a low density comprises a multitude of channels that can suck a liquid applied at the edge of the layer stack into the inside as a result of capillary action. A paper having a density $\rho_2$>0.6 g per cm$^3$ is preferably employed as the storage layer. Papers having this high density comprise only small channels that are especially suited for limiting the ion current in the electrolyte and, thus, for contributing to a high dielectric strength of the electrolytic capacitor.

Further, it is especially advantageous to employ a paper as the suction layer wherein a line or wave structure is impressed. A paper provided with a wave structure can, for example, look like a corrugated sheet. As a result of the impressed lines or, respectively, waves, the absorbency of the paper is enhanced, whereby the internal structure is largely preserved. A paper having a high density $\rho_2$>0.6 g per cm$^3$ can therefore be employed. Such a paper then has the advantage that, on the one hand, it is suited as the suction layer and, on the other hand, comprises an enhanced dielectric strength, as a result whereof the thickness of the storage layer can be reduced.

Moreover, a layer stack is especially advantageous wherein the suction layer and the second storage layer are the plies of a two-ply paper. Such a two-ply paper can, in particular, be advantageously employed when the layer stack is wound on a winding mandrel. The two-ply paper has the advantage that it is does not tear as readily. An electrolytic capacitor manufactured of a layer stack wound onto a winding mandrel can be realized especially easily and quickly. Moreover, its capacitance can be very easily set by means of the plurality of the turns. The employment of a two-ply paper in band form for winding onto a winding mandrel is especially advantageous because only one band then need be supplied for the paper layer between anode foil and cathode foil.

The invention is explained in greater detail below on the basis of an exemplary embodiment and the Figures appertaining thereto.

DESCRIPTION OF THE PREFERRED EMBODIMENTS

Figure 1:
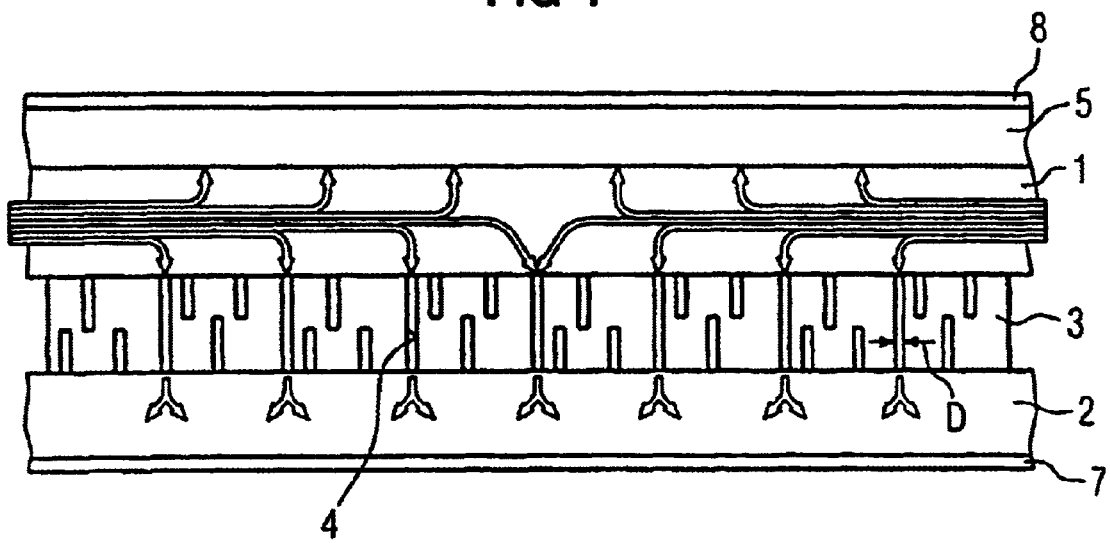
FIG. 1 shows an inventive layer stack that is fashioned as an electrolytic capacitor in a schematic cross-section.

FIG. 1 shows an inventive layer stack having an intermediate layer 3 fashioned as anode. The anode is approximately 100 μm thick and is composed of aluminum and is provided on both sides with approximately 0.2 through 1 μm thick oxidized aluminum. Particularly for the employment of high-voltage electrolytic capacitors, holes 4 are etched into the intermediate layer 3 that connect the two sides of the intermediate layer 3 to one another. The etching of the holes 4 occurs, for example, by means of electrolytic etching in HCl. The holes 4 that thereby arise have a diameter D between 1 and 3 μm and are therefore suitable for the transport of a liquid from the upper side of the intermediate layer 3 to the underside of the intermediate layer 3. An edge or boundary layer 7 that is fashioned as a first cathode layer is arranged at the underside of the layer stack. Just like the second cathode layer 8 arranged at the upper surface of the layer stack, the cathode layer is fashioned as a 20 through 30 μm thick aluminum foil that is covered with a thin aluminum oxide layer.

A respective storage layer 2, 5 is arranged at the boundary or surface layer 7 or, respectively, at the second cathode layer 8. This storage layer is composed of paper having a density of approximately 0.8 g per cm$^3$. Such a paper can, for example, be manufactured of cellular material. Due to its density, it is suitable for lending the electrolytic capacitor a high dielectric strength. The two storage layers 2, 5 must be saturated with an electrolyte. Since an application of the electrolyte is only possible at the edge of the layer stack, the electrolyte must be transported into the inside of the layer stack by means of a suitable, further layer. A suction layer 1 is therefore arranged between the second storage layer 5 and the intermediate layer 3, and the suction layer 1, as indicated by arrows, transports the electrolyte from the edge of the layer stack into the inside and thereby saturates the second storage layer 5 with electrolyte. By utilizing the holes 4 in the intermediate layer 3, the first storage layer 2 can also be saturated with electrolyte with the assistance of the suction layer 1 without having to arrange a further or additional suction layer at the underside of the intermediate layer 3. The suction layer is composed, for example, of a paper having a density of 0.4 g per cm$^3$ and has a thickness of 55 μm. It can, for example, be fabricated of jute paper. The fiber spacings in a jute paper are so great that the paper is excellently suited for the absorption of liquids. Since the suction layer 1 also delivers a contribution to the dielectric strength of the capacitor, the second storage layer 5 can be selected somewhat thinner at 40 μm than the first storage layer 2 at 65 μm. Due to the omission of a second suction layer arranged under the intermediate layer 3, an electrolytic capacitor with high capacitance and low space requirement can be realized with the inventive layer stack.

Figure 2:
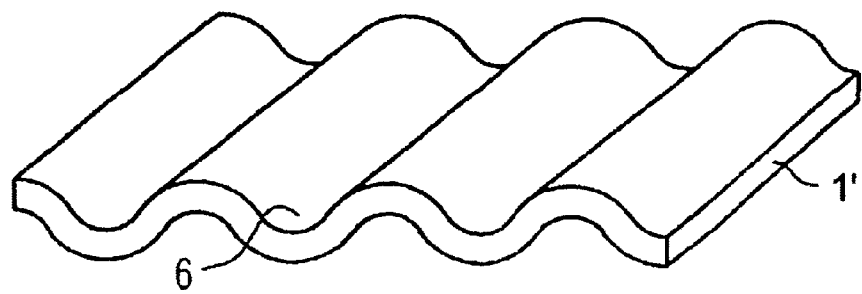
FIG. 2 shows an inventive suction layer having an impressed wave structure.

FIG. 2 shows a suction layer 1' into which a wave structure 6 is impressed. As a result of the impressed waves, the suction layer 1' has an enhanced absorbency since the waves form a type of channel wherein fluid can be transported. Due to the increased absorbency, suction layers 1' fashioned in this way can also be fabricated of denser paper having a density between 55 and 70 g per cm$^3$. Such a suction layer 1' then has a higher dielectric strength, so that the second storage layer 5 shown in FIG. 1 can be implemented thinner with an elimination of the corresponding space.

The invention is not limited to the embodiments shown by way of example but is defined by the broadest description of the Summary of the Invention.

I claim:

1. A layer stack for the acceptance of a liquid, said stack comprising a suction layer with high absorbency sufficing for sucking up the liquid from the edge of the layer stack into a middle of the stack; a first storage layer with low absorbency that is not sufficient for sucking up the liquid from the edge of the layer stack up to the middle; an intermediate layer composed of non-absorbent material being arranged between the first storage layer and the suction layer; a non-absorbent boundary layer being arranged at that side of the first storage layer facing away from the intermediate layer, and the intermediate layer having through holes whose plurality, size and distribution are selected so that some of the liquid suctioned up by the suction layer can proceed via the holes to the first storage layer and thoroughly saturate the first storage layer.

2. A layer stack according to claim 1, which includes a second storage layer adjoining the suction layer.

3. A layer stack according to claim 2, wherein the second storage layer adjoins the intermediate layer.

4. A layer stack according to claim 2, wherein the suction layer adjoins the intermediate layer.

5. A layer stack according to claim 2, wherein the boundary layer is a first cathode layer, the intermediate layer is an anode layer and which includes a second cathode layer adjoining the second storage layer so that the stack can be formed into an electrolytic capacitor.

6. A layer stack according to claim 5, wherein the intermediate layer is an aluminum foil covered with approximately 0.5 μm thick aluminum oxide layer and the holes are channels electrolytically etched in the aluminum foil with a diameter between 1 μm and 3 μm.

7. A layer stack according to claim 5, wherein the suction layer is a paper layer into which a wave structure is impressed for increasing the absorbency.

8. A layer stack according to claim 5, wherein the suction layer and the second storage layer are the plies of a two-ply paper.

9. A layer stack according to claim 5, wherein the suction layer is a paper layer with a density $\rho_1 < 0.6$ g/cm$^3$ and the first and second storage layers are paper layers with a density $\rho > 0.6$ g/cm$^3$.

10. A layer stack according to claim 5, wherein the suction layer is a paper layer with a line structure for increasing the absorbency.

11. A layer stack according to claim 5, wherein the stack is wound onto a winding mandrel.

12. A layer stack according to claim 2, wherein the suction layer is a paper layer with a density $\rho_1 < 0.6$ g/cm$^3$ and the first and second storage layers are paper layers with a density $\rho_2 > 0.6$ g/cm$^3$.

13. A layer stack according to claim 2, wherein the suction layer is a paper layer into which a wave structure is impressed for increasing the absorbency.

14. A layer stack according to claim 2, wherein the suction layer and the second storage layer are the plies of a two-ply paper.

15. A layer stack according to claim 2, wherein the stack is wound onto a winding mandrel.

16. A layer stack according to claim 1, wherein the suction layer is a paper layer with a density $\rho_1 < 0.6$ g/cm$^3$ and the first storage layers is a paper layer with a density $\rho_2 > 0.6$ g/cm$^3$.

17. A layer stack according to claim 1, wherein the suction layer is a paper layer into which a wave structure is impressed for increasing the absorbency.

18. A layer stack according to claim 1, wherein the suction layer is a paper layer with a line structure impressed therein to increase the absorbency.

19. A layer stack according to claim 1, wherein the stack is wound onto a winding mandrel.

* * * * *